United States Patent [19]
Decusatis et al.

[11] Patent Number: 5,450,508
[45] Date of Patent: Sep. 12, 1995

[54] APPARATUS AND METHOD FOR OPTICAL FIBER ALIGNMENT USING ADAPTIVE FEEDBACK CONTROL LOOP

[75] Inventors: Casimer M. Decusatis, Poughkeepsie, N.Y.; Lawrence Jacobowitz, Essex Junction, Vt.

[73] Assignee: International Business Machines Corporation, Armonk, N.Y.

[21] Appl. No.: 351,925

[22] Filed: Dec. 8, 1994

[51] Int. Cl.$^6$ .............................................. G02B 6/28
[52] U.S. Cl. ...................................... 385/25; 385/22; 385/15; 385/94
[58] Field of Search ....................... 385/28, 27, 15, 16, 385/22, 25, 94, 227.11, 227.15, 227.16

[56] References Cited

U.S. PATENT DOCUMENTS

| | | | |
|---|---|---|---|
| 4,657,339 | 4/1987 | Fick | 385/21 |
| 4,759,597 | 7/1988 | Lemonde | 385/22 |
| 5,155,786 | 10/1992 | Ecker et al. | 385/94 |
| 5,173,668 | 12/1992 | Jacobowitz et al. | 333/156 |
| 5,208,880 | 5/1993 | Riza et al. | 385/25 |
| 5,241,614 | 8/1993 | Ecker et al. | 385/94 |
| 5,304,969 | 4/1994 | Jacobowitz et al. | 333/260 |
| 5,333,225 | 7/1994 | Jacobowitz et al. | 385/93 |
| 5,337,388 | 8/1994 | Jacobowitz et al. | 385/76 |

OTHER PUBLICATIONS

Article in Fiberoptic Product News, vol. 10, pp. 23–24, 1992, Oct. entitled "Electrostrictive Actuators Offer NM-Scale Motion Control" by Pete Neely, Newport/Klinger.

*Primary Examiner*—Frank Gonzalez
*Assistant Examiner*—Phan T. H. Palmer
*Attorney, Agent, or Firm*—Bernard M. Goldman

[57] ABSTRACT

A servo-feedback method with elements for dynamically aligning a pair of mating ends of optical fibers supported in a pluggable connector. At least one of the mating ends in the pair receives light from the other mating end. The light-receiving end is mechanically vibrated (dithered) by a piezo-electric driving element relative to the other mating end in the pair to dither modulate the light passing to the receiving end. The dither modulation on the dither modulated light is electrically detected and processed relative to a dither reference wave using an analog-to-digital converter and a processor method. The detected dither modulation presents a unique waveform, in which a frequency doubling effect occurs in both half cycles of the dither reference waveform whenever the mating ends dither about their steady-state aligned position, and no dynamic error signal is then generated. A slight mis-alignment of the mating ends from their steady-state aligned position is indicated when the double frequency effect occurs only in one half cycle of each reference dither cycle, and the direction of the error signal and servo movement is indicated by detecting which of the reference half cycles has the double frequency.

22 Claims, 8 Drawing Sheets

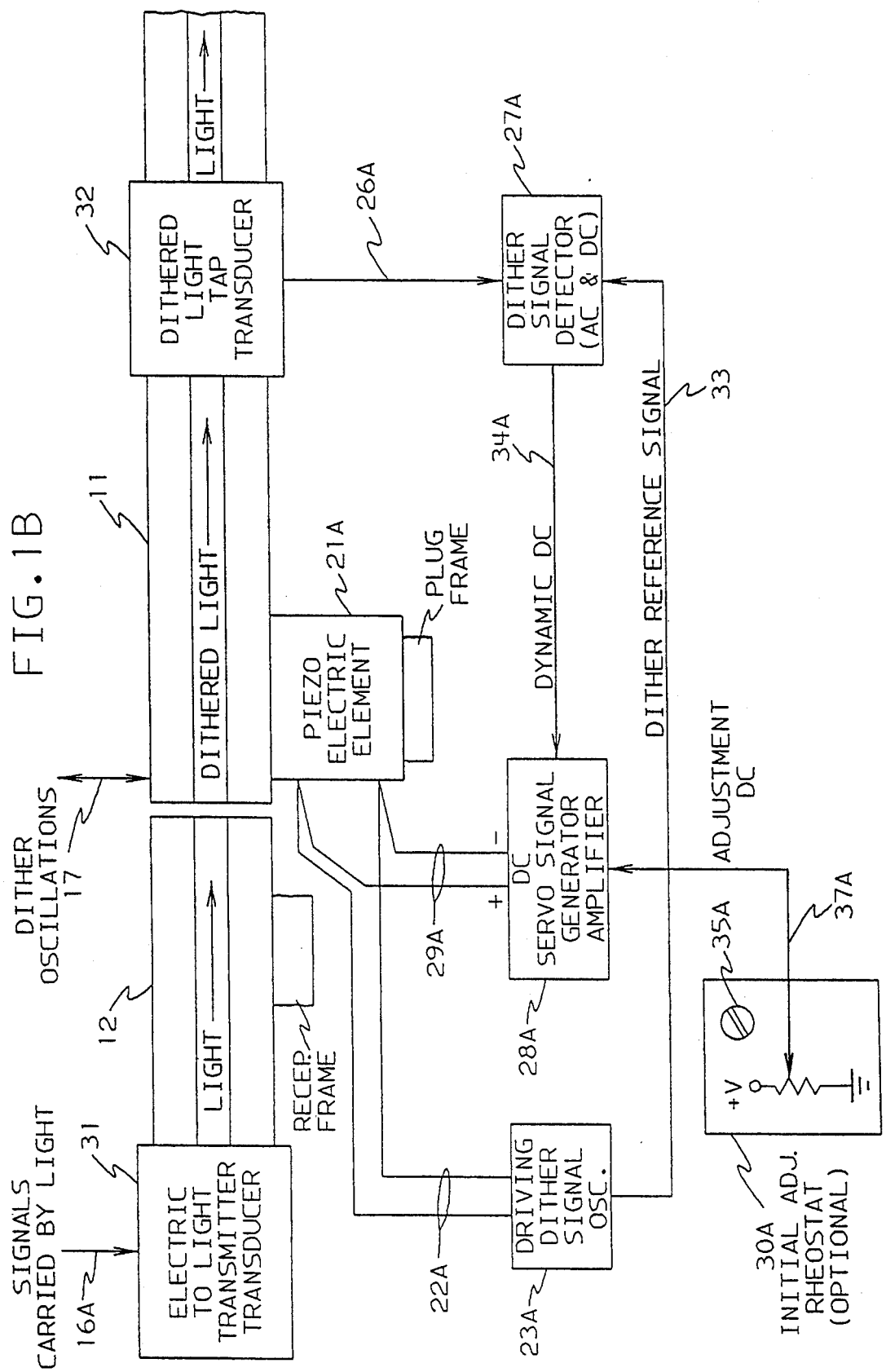

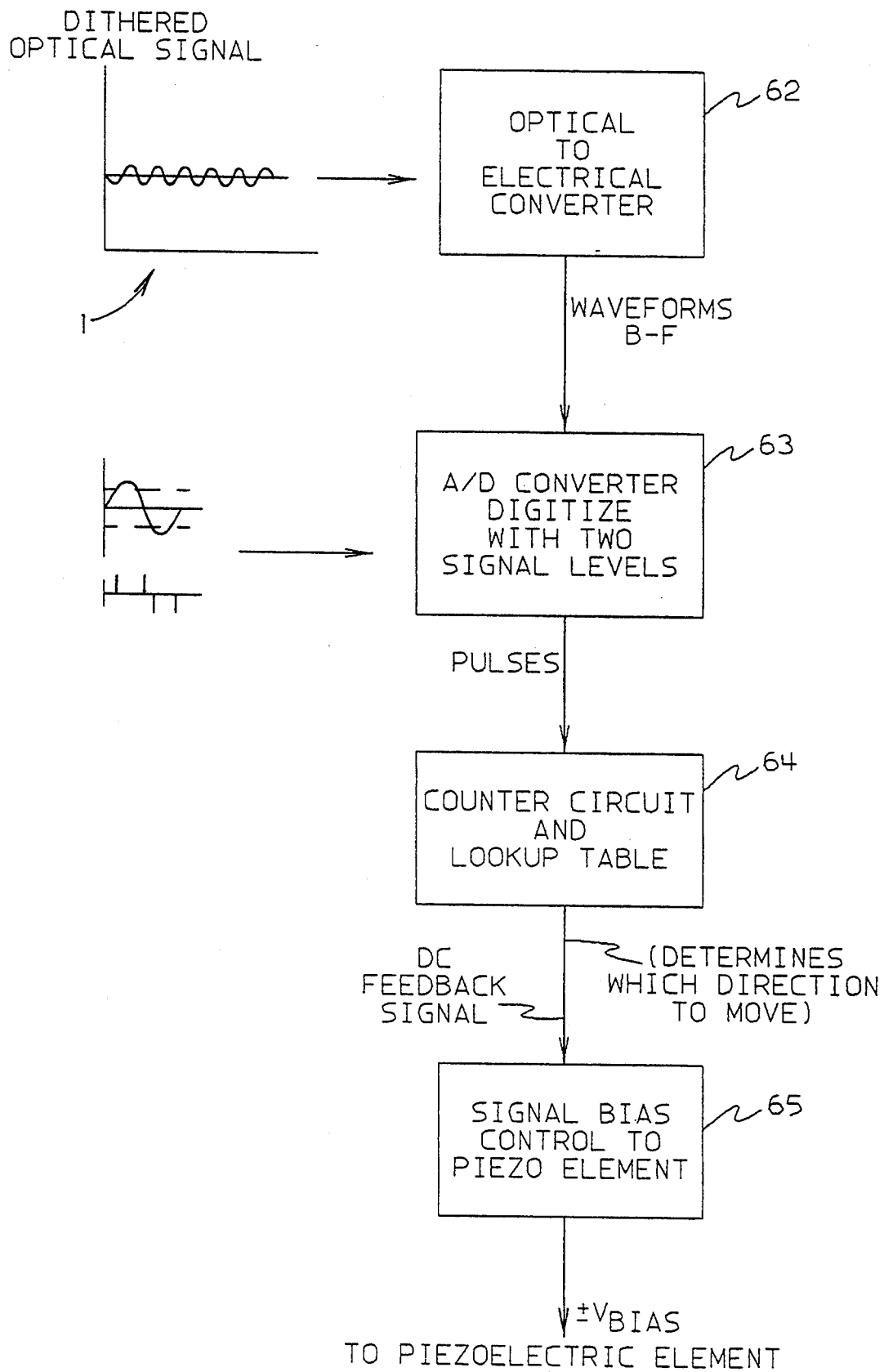

FIG. 3B
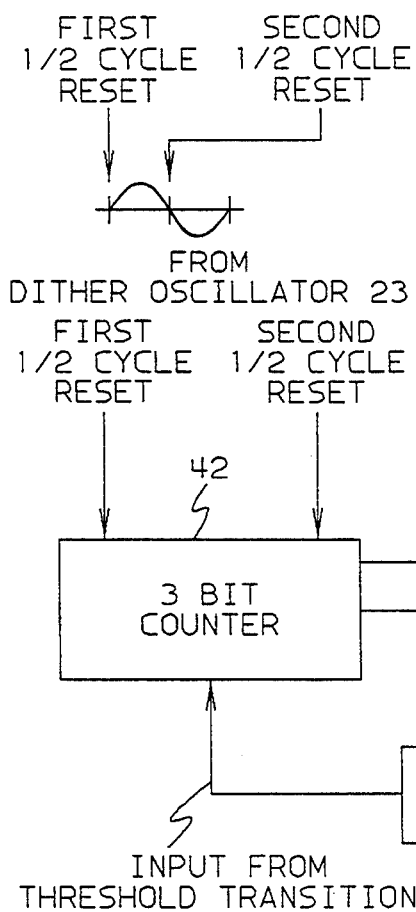
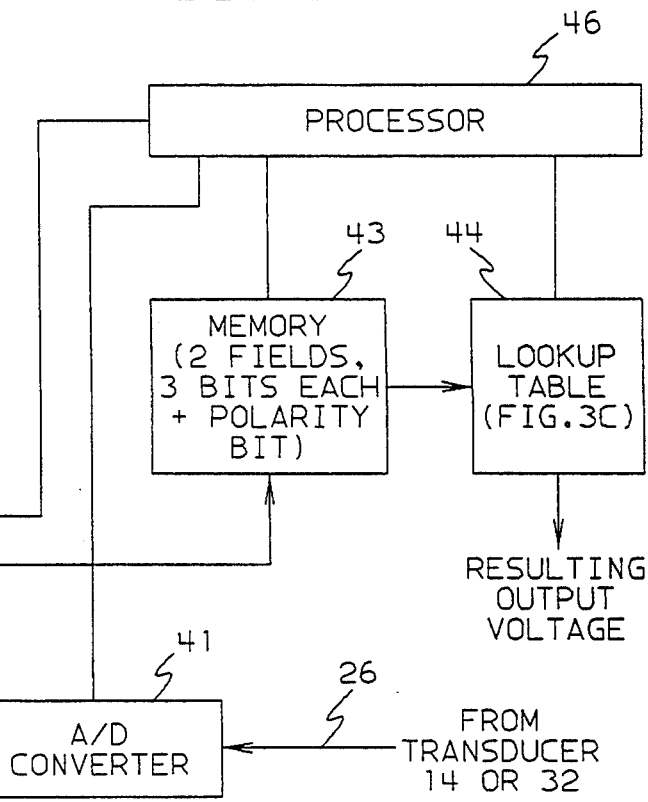
FIG. 3C
| 1/2 CYCLE LOOKUP TABLE ||||
| POLARITY BIT STATE | FIRST 1/2 CYCLE (3 BITS) | SECOND 1/2 CYCLE (3 BITS) | RESULTING OUTPUT VOLTAGE |
| --- | --- | --- | --- |
| 0 | 2 | 2 | +V (STATE B) |
| 0 | 2 | 4 | +V/2 (STATE C) |
| 1 | 4 | 4 | 0 (STATE D) |
| 1 | 4 | 2 | -V/2 (STATE E) |
| 1 | 2 | 2 | -V (STATE F) |

APPARATUS AND METHOD FOR OPTICAL FIBER ALIGNMENT USING ADAPTIVE FEEDBACK CONTROL LOOP

CROSS REFERENCED PATENT APPLICATIONS

This patent specification describes and claims a servo feedback system which may be applied to optical fibers connectors of the type disclosed in the following referenced patent applications: U.S. Pat. No. 5,333,225 (PO9-93-021) entitled "Substrate-embedded Pluggable Receptacles For Connecting Clustered Optical Cables To A Module", Ser. No. 08/101,120 (PO9-93-022) entitled "Pluggable Connectors For Connecting Large Numbers Of Electrical and/or Optical Cables To A Module Through A Seal", Ser. No. 08/101,121 (PO9-93-023) entitled "Substrate-embedded Pluggable Receptacle For Connecting Clustered Electrical Cables To A Module", and U.S. Pat. No. 5,337,388 (PO9-93-024) entitled "Matrix Of Pluggable Connectors For Connecting Large Numbers Of Clustered Electrical and/or Optical Cables To A Module". Some common inventorship of these related applications are present as inventors of the subject application.

Other previously filed applications and issued patents by some of the joint inventors on the subject application include: U.S. Pat. No. 5,241,614 (FI9-90-001X) entitled "Apparatus And A Method For An Optical Fiber Interface" by M. E. Ecker and L. Jacobowitz, and U.S. Pat. No. 5,304,969 (FI9-92-053X) entitled "Apparatus and a Method for an Electrical Transmission-Line Interface" by M. E. Ecker and L. Jacobowitz.

U.S. Pat. No. 5,155,786 (FI9-90-001) entitled "Apparatus and a Method for an Optical Fiber Interface" by M. E. Ecker and L. Jacobowitz, and U.S. Pat. No. 5,173,668 (FI9-91-053) entitled "Apparatus and a Method for an Electrical Transmission-Line Interface" by M. E. Ecker and L. Jacobowitz.

FIELD OF THE INVENTION

This invention relates to a servo-feedback method and means for aligning optical fibers supported in a pluggable connector. This invention provides a methodology for dynamically aligning the optical fiber at a connection interface within the pluggable connector while data is being communicated across the interface. This dynamic alignment supplements any static alignment provided in the manufacture of the optical engaging fiber arrays at the interface. The allowable tolerance of the spacing variations at the interface of the fiber connection determines the manner and cost of manufacturing a connector containing this invention. This invention may allow plastics or other inexpensive materials to be used in the manufacture of a connector, when thermal expansion coefficients are poorly matched preventing use in conventional pluggable connectors.

BACKGROUND OF THE INVENTION

Fiber optic data links have become commercially important to meet the high bandwidth and distance requirements of computer and telecommunications network technology. An alignment problem exists for optical fibers in disconnectable or pluggable connectors, particularly in harsh environments where alignment must be continuously readjusted to compensate for external shock effects and environmental factors of temperature, humidity, etc.

Some attempt has been made to address this problem by placing extremely tight mechanical tolerances on parts within optical connectors, which are statically supported in a connector. Tight mechanical tolerances increase cost and make the connectors difficult to manufacture. This problem is especially acute for the optical transmission lines arranged in a parallel array of fibers, for which a connector must passively compensate for tolerance runout across the array, i.e. variations in the spacing between the fibers in the array, in which the array's alignment must not be affected by environmental factors of temperature, humidity, etc. Even when passive alignment is achieved in some cases, the repeatability of the alignment in a pluggable connector, and the effects of harsh conditions, may be inadequate maintain alignment for some applications.

Conventional connectors attempt to obtain low optical loss at their optical interfaces by placing tight mechanical tolerances on the connector parts, which increases costs and causes manufacturing problems—even for connectors of single fiber transmission lines. The connector tolerance problems are compounded for connectors of transmission lines having an array of optical fibers.

Even when passive alignment is achieved in a connector, such alignment repeatability in another connector may be insufficient. Maintaining the alignment in the same connector may be impossible under extreme environmental conditions.

The prior art includes:
1. D. Hardwick, Polytec Optronics Catalog, Polytec Optronics Inc., Auburn, Mass. 01501 (1992).
2. P. Neely, "Electrostrictive actuators offer nanometer scale motion control", Fiberoptic Product News vol. 10, p. 23 (1992).

SUMMARY OF THE INVENTION

An object of this invention is to provide alignment means and feedback controls for an active (dynamic) alignment interface in a fiber-to-fiber interconnection. The interconnection is preferably in a plugable connector for a fiber array type of transmission line. The connector is preferably mounted on a single-chip or multichip electronic module, which may be a plastic or ceramic electronic module.

Another object of this invention is to provide alignment control means in fiber connectors to relieve tolerance constraints within the connectors, and to relieve materials constraints in connector manufacture that would cause misalignment, such as thermal tolerance sensitivity.

A feature of this invention is to detect fiber alignment by using a "dither" signal at a connector interface while the interface is being used to transmit data, so that fiber data transmission is not interrupted, or in any way affected, by servo operation.

The dither signal mechanically oscillates the ends of either fiber array in the connector with respect to the ends of the other fiber array, e.g. the receptacle fiber interface is dither oscillated with respect to the plug fiber interface about a centralized equilibrium position. The dither oscillation between the mating ends of fibers slightly changes the amount of light that passes through the mating fibers to modulate the light transmitted through those fibers at a very low frequency compared to the modulated frequency of the light for carrying its broad bandwidth of modulated signals. This great frequency difference makes it easy to separate the dither-oscillating light signals from the light carrier modulated signals being simultaneously transmitted through the fibers.

The mechanical dither oscillations between mating fiber ends provide a dither reference frequency to modulate the light passing between these mating ends. When the mating ends are steady-state aligned, or slightly mis-aligned, a "frequency-doubling effect" occurs to the modulated light passing through the mating ends due to the fiber ends moving through their aligned position twice during a dither oscillation half-cycle. When the mating ends are steady-state aligned, the double frequency waveform occurs in both halves of each dither cycle. But when the mating ends are slightly mis-aligned, the double frequency waveform occurs in only one half of each dither reference cycle. This frequency doubling characteristic is used by this invention to detect steady-state alignment, and slight mis-alignment conditions.

When the mating fiber ends are slightly mis-aligned, the double frequency waveform may occur in either half of each dither cycle; and the other half of each cycle occurs at the dither reference frequency (single frequency half-cycle). The servo movement direction needed for obtaining alignment (during the slight mis-alignment condition) is determined by detecting which half of the dither reference cycle contains the double frequency.

If the mating fiber ends are highly mis-aligned, then only a single frequency waveform is detected in all dither cycles (neither half contains the double frequency). That is, a one-half cycle modulation waveform is detected for each half-cycle of the dither reference frequency. The servo direction for correcting the high mis-alignment is indicated by determining the phase of the detected modulated waveform cycle relative to the dither reference cycle.

This invention generates a DC feedback servo signal from the detected single and double half cycles. Detection of a double frequency cycle for all dither reference half cycles indicates alignment exists between mating fiber ends, and that no feedback signal is to be provided.

A low effective-level of DC servo feedback signal is provided if the mating fiber ends are slightly mis-aligned—by generating the servo feedback signal only for the half-cycle in which the double frequency waveform is detected. The DC polarity of the feedback signal is determined according to whether the first half or the second half of the dither cycle is detected to have the double frequency waveform, and this polarity causes the servo to move the light-receiving mating fiber end toward its aligned position.

A high effective-level of DC servo feedback signal is provided if the mating fiber ends are highly mis-aligned—by generating a servo feedback signal for all half-cycles. The DC polarity of the feedback signal is determined according to whether the detected cycles are in-phase or out-of-phase with the dither cycle. The in-phase detected waveform, for example, may cause generation of a positive polarity; and the out-of-phase detected waveform, for example, may cause generation of a negative polarity—with the generated polarity always driving the servo toward the aligned position of the mating ends.

In the preferred embodiment, the occurrence of a single frequency or a double frequency is detected during each dither oscillator half cycle by digitizing the detected waveform—for which two pulses are generated for each half cycle of the detected wave form, whether the half cycle is at the single or double frequency. Then, the digitized pulses are counted during each dither half cycle. A count of 4 pulses during every half cycle of the dither reference signal (i.e. 8 pulses per dither full cycle due to frequency doubling) indicates servo alignment of mating ends.

A count of 4 pulses during one half cycle and a count of 2 pulses during the next half cycle of the dither reference signal (i.e. 6 pulses per dither full cycle due to half-cycle frequency doubling) indicates a slight mis-alignment of the mating ends. The polarity of the servo signal is determined by which half cycle contains the 4 pulses (for example, a positive polarity if the first dither half-cycle contains the 4 pulses, and a negative polarity if the second dither half-cycle contains the 4 pulses).

A count of 2 pulses during every half cycle (i.e. 4 pulses per dither full cycle due to half-cycle frequency doubling) indicates a high mis-alignment of the mating ends. The polarity of the servo signal is determined by the phase of the detected single frequency waveform. For example, a positive polarity being generated for an in-phase detected condition; and a negative polarity being generated for an out-of-phase detected condition.

The servo error control signal is a direct current (DC) component in the servo signal which expands/contracts a piezo-electric, or electrostrictive, element in a direction toward obtaining alignment of the mating ends.

The DC servo signal may be combined with the dither signal in a single element that provides both the dither movement and the aligning servo movement.

Initially, a constant DC signal may be adjusted to a steady-state value which is combined with the servo-generated feedback signal to align the mating ends when there is zero feedback signal in the servo. This initial alignment adjustment is maintained throughout the operation of the servo to bias the servo feedback signal to a steady-state alignment value. Then, the dither operated feedback need only adjust for later drift in the mating ends from the initially adjusted alignment.

In some cases (such as where the surrounding temperature is very stable and no external vibration exists), the initial adjustment may be sufficient without providing the dither oscillation items and the resulting servo feedback. This simplified arrangement of this invention may save the cost of the dither feedback components.

The dither frequency may be in the range of a 1000 Hz, which is so much lower than the frequency of the light modulation carried in the optical fiber (1000s of gigahertz) that the dither signal cannot interfere with any signals being carried by the light path passing through the fibers in a connector.

The invention may be applied to one or more mating fiber ends in a connector, which may connect one or more fiber paths, e.g. an array of fiber paths. A single servo-controlled fiber in a connector may be bound to all other fibers in an array of fibers attached together in one linear dimension. For example, the array of fibers may have their mating ends positioned along one or more V-grooves formed in mating surfaces between a plug and receptacle of a connector. The V-groove prevents relative plug-to-receptacle movement in a dimension transverse to the V-groove, so that the servo-controlled movement is needed only in the direction of the V-groove bottom on which movement is allowed. Plug and receptacle mating surfaces may be biased together by spring or detent means in the connector to eliminate the need for any dither or servo in the fiber array's dimension transverse to the bottom of the V-groove.

It is also possible to have an alignment servo provided for each fiber in an array of fibers to control their independent alignment in the V-groove direction.

On the other hand in a non-V-groove arrangement, a single fiber in a connector may have two transverse dither elements supported in the connector (such as in its receptacle). These two dither elements support two independent transverse servo arrangements that maintain alignment in the two transverse directions of movement for the receiving fiber end. The two transverse dimensions are each transverse to the axis of the array of fibers. Thus, the two servos avoid the use of a V-groove at the mating fiber interface.

On the other hand, four fibers in an array of fibers may each be connected to, and controlled by, one of the transverse dither controlled servos described in the prior paragraph. These fibers may be located anywhere in their array, such as for example having two fibers respectively controlling the transverse servo directions of alignment on each side of the array.

Further, all of the fibers in an array may have respective dither means and servos, but this is generally unnecessary. Thus, multiple dither means and moving means may be built into a connector for its one or more fiber paths.

In this manner precision alignment is obtained and maintained between mating fiber ends in a connector having one or more optical fibers in an arrays of optical fibers in a pluggable connector. Precise alignment may be maintained to compensate for variations in ambient conditions of shock, vibration, temperature, humidity, etc.

All parts of the servo alignment system provided by this invention may be completely self-contained in the pluggable connector, or the servo electical circuits may be located in a semiconductor chip mounted on a module supporting the connector. Other applications than pluggable connectors, such as optical data storage systems with read/write optical disks, may benefit from use of the servo feedback arrangement provided by this invention.

The active alignment provided by the servo controls of this invention may supplement a passive alignment arrangement meeting a predetermined level of tolerance manufactured into the parts of the connector and in the fiber array pluggably connected by the connector. This invention allows a relaxation in the manufacturing tolerances of pluggable connectors, and a resulting reduction of their cost. This invention allows the use of inexpensive materials having poorly matched thermal expansion coefficients, which otherwise could not be used in the pluggable connectors, because their use would result in misalignment due to normal daily thermal cycling, or environmental vibration occurring in practical environments. This is particularly so for unusually harsh environments where shock, vibration, or other mechanical stresses could affect a passive system.

Thus, this invention may control an active alignment without the need for operator intervention to adjust the alignment, or be supplemented with operator initial adjustment.

Hence, a simple way to use this invention is for it to actively align a single optical fiber plug with a single optical fiber receptacle in a connector. A more complex way to use this invention is in an array connector, in which has the ends of an array of transmission lines in the connector plug are to be aligned with the ends of a similar array of transmission lines in the connector's receptacle.

The fibers in an array attached to respective dither drivers with respective servo drivers may be called alignment reference fibers. An optical fiber array may have a subset of its fibers used as reference fibers, such as a fiber at either end of the connector. Where a single fiber of an array is used as a reference fiber, it may be preferable to select it in the middle of its array, and its alignment operations may be sufficient to control the array alignment with acceptable alignment performance.

The invention provides an adaptive control system with closed loop active feedback consisting of a control signal obtained from monitoring the optical signal, optional amplification or other processing of the signal, and a closed-loop feedback path to a mechanical actuator which changes the position of the optical element being monitored to bring it into improved alignment in response to the error signal.

The invention may move the relative positions between an optical fiber receptacle and plug from an initial position to a new position several microns away and then maintaining the receptacle or plug in this new position (the amount of motion is proportional to the control signal described above (the speed of the motion may not be critical, and the positioning accuracy depends on the application). For example, a maximum tolerance of one micron may be required for alignment of two single-mode optical fibers, while the alignment of two multimode fibers may accommodate tolerances of tens of microns due to the larger core diameters. In the preferred embodiment, this is realized with a piezoelectric element or an electrostrictive film as a servo driving element.

BRIEF DESCRIPTION OF DRAWINGS

The invention may best be understood with reference to the accompanying drawings in which:

FIGS. 1A and 1B are electical/mechanical representations of two simple embodiments of this invention for operating with light being respectively transmitted in each of two directions.

FIGS. 2A(B) through 2A(F) show dither-modulated waveforms, their associated alignment positions for mating fiber ends, and their intensity variations of dither-modulated light which is generating the waveforms for different alignment states of the respective mating ends (shown by shaded and unshaded circles).

FIGS. 3A through 3C shows a process used in the generation of a servo feedback control signal from dithered-modulated waveforms of the type shown in FIGS. 2A(B) through 2A(F) when using A/D converter and digital detector circuits.

DESCRIPTION OF THE DETAILED EMBODIMENT

Figure 1A:
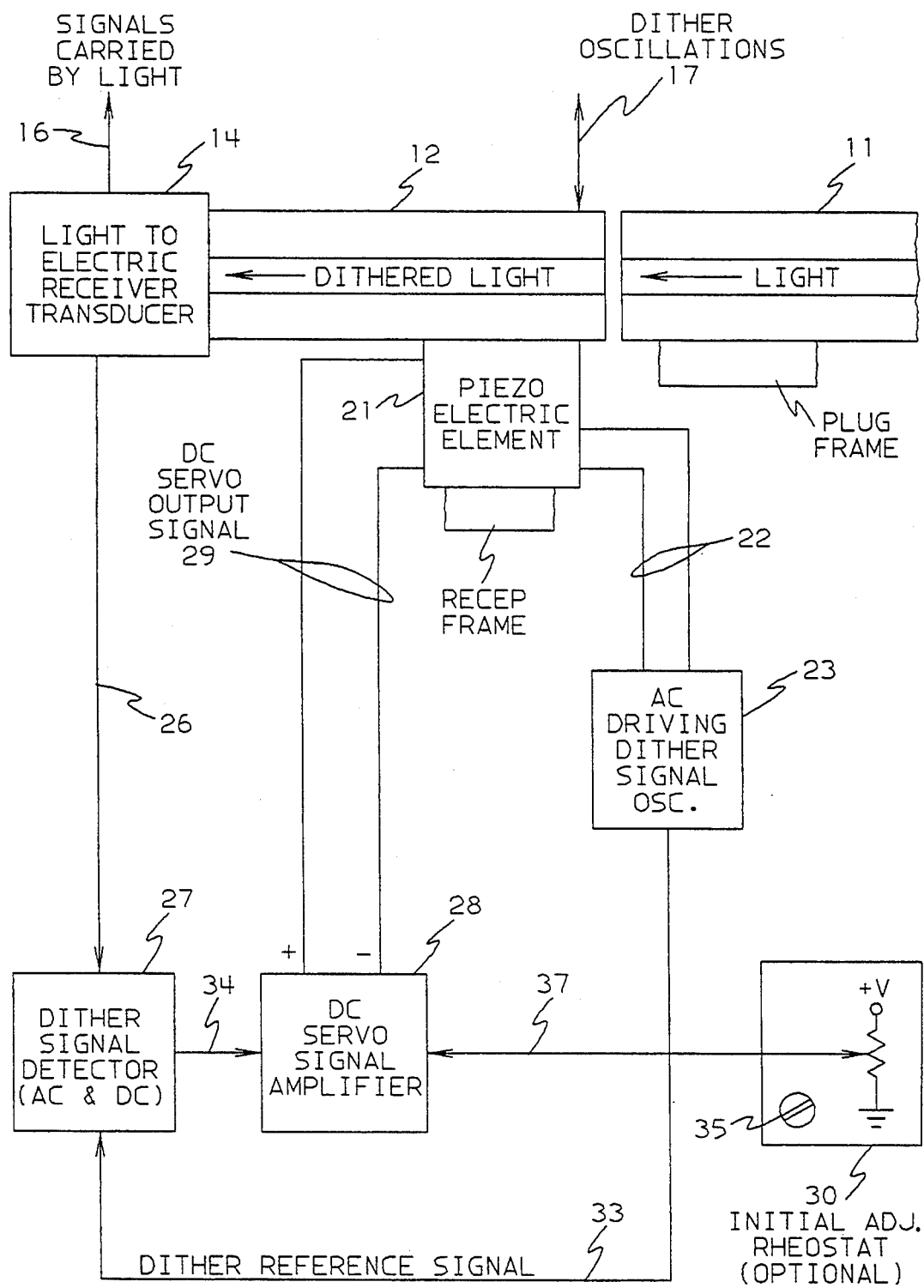

FIGS. 1A and 1B are electical/mechanical representations of two embodiments of this invention. They are used to explain basic principles used in this invention. Each of FIGS. 1A and 1B contains a servo system for aligning a mating end of a plug fiber and a mating end of a receptacle fiber in an optical fiber connector. FIGS. 1A and 1B differ in the direction of light being handled. In FIG. 1A, the servo operates on received light, and in FIG. 1B the servo operates on transmitted light. The light direction is relative to whether a module associated with the connector has circuits for either receiving or transmitting light, or handles light bidirectionally.

A suffix "A" is appended to reference numbers in FIG. 1B for components similarly found in FIG. 1A, and they operate in the same manner in both FIGS. 1A and 1B.

In a fiber system that continuously communicates light bidirectionally, only one of the alignment systems in FIGS. 1A and 1B need be used, but the system in FIG. 1A may be preferable because it has fewer parts than the system in FIG. 1B.

In a fiber system that unidirectionally transmits light in both directions (but in one direction at a time), both of the alignment systems in FIGS. 1A and 1B may need to be combined into the same connector. The combined system may reduce the total number components to less than the sum of the components in two separate systems by having only one of each component common to both systems.

FIGS. 1A and 1B each includes a plug fiber 11 (supported in a plug part of a connector), and a receptacle fiber 12 (in a receptacle part of the connector). The connector may be of the type shown in FIGS. 4 and 5, in which any fiber in an array of fibers 15 may be represented in FIGS. 1A or 1B by its plug fiber 11 and its mating receptacle fiber 12. Alternatively the connector may contain only a single fiber instead of an array of fibers.

Steady-state alignment occurs between the mating ends of fibers 11 and 12 when the plug is engaged in the connector. This steady-state alignment may vary from complete alignment (in which the engaged ends completely overlap each other) to extreme misalignment (in which the engaged ends have no overlap with each other) that prevents any light from being passed between the mating ends in the connector.

Usually, the plugged steady-state alignment will be somewhere between these positions in which such connector misalignment may significantly reduce the intensity of light signals passing through the connector. Thus, the steady-state position may be any alignment position in a range between complete alignment and high degree of misalignment.

In FIG. 1A light is being transmitted from plug fiber 11 to receptacle fiber 12. In FIG. 1B light is being transmitted from receptacle fiber 12 to plug fiber 11.

The light waves carried in the optical fiber may be conventionally modulated with any of various types of wide-band signals, which are not part of this invention. This invention deals only with the dither modulation for servo control.

In FIG. 1A, the dither-modulated light is received by a light-to-electric receiver/transducer 14 connected to receptacle fiber 12. Transducer 14 outputs the conventionally modulated signals on a bus 16 to conventional utilization means not a part of this invention. The dither-modulated electric signal is provided on line 26 to a dither signal detector 27 which contains a low-pass filter that passes only the dither modulated signals.

In FIG. 1B, the light is received by a light-to-electric receiver/transducer in a dithered light tap 32, which is connected to plug fiber 11 and passes the conventionally modulated light to an optical fiber line for external transmission. Transducer 32 outputs the conventionally modulated light signals for external transmission, and passes the dither-modulated electric signal on line 26A to a dither signal detector 27A which contains a low-pass filter that passes only the dither modulated signals.

Figure 2A:
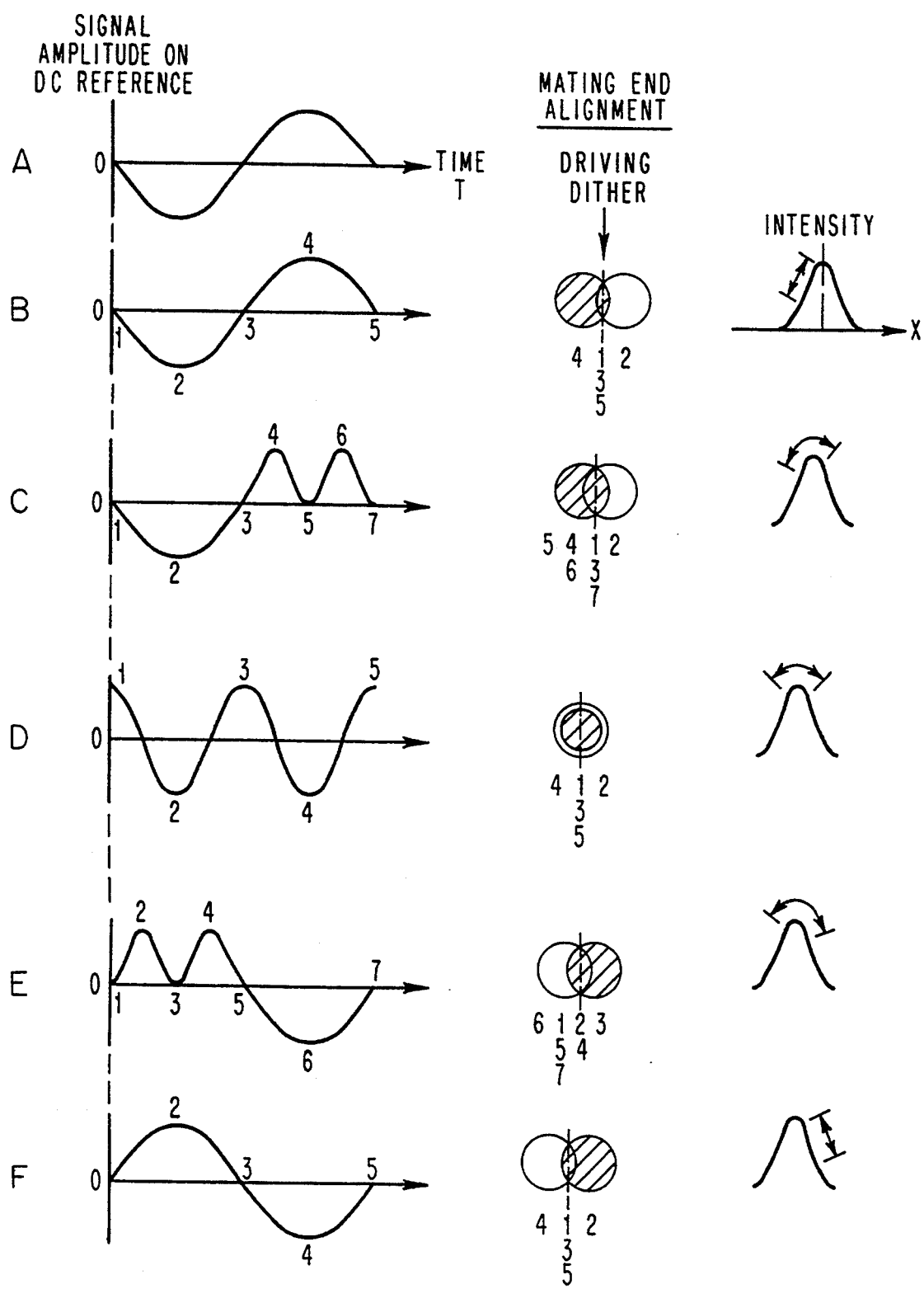
FIG. 2A(A) a dither oscillator reference signal.

This invention adds an electo-mechanical element 21 or 21A to mechanically oscillate (dither) a light-receiving fiber end (of a pair of mating fiber ends) in the connector. Element 21 and 21A also operated as a servo actuator to move the light receiving fiber end toward its aligned position with its mating fiber end. The dithering mechanical oscillation dither modulates the intensity of the received light signal. The central column in FIG. 2A shows various alignment positions for the mating fiber ends, and these positions are called "steady-state positions" because they each represent a position about which the dither oscillation occurs (in the horizontal direction in FIG. 2A).

The dither modulation is detected in circuits 27 and 27A in a process of generating a feedback servo signal which provides a resulting output signal on line 34 (or 34A) to a DC servo signal amplifier 28. Finally amplifier 28 completes the generation of the servo signal and applied it to the same electro-mechanical element, providing it with a second use as a servo actuator for obtaining and maintaining alignment between the mating ends. The electo-mechanical element may be any electrical-to-mechanical transducer which can expand/contract in a required current/voltage range to provide a required amount of mechanical movement, and for example, it may be a piezoelectric element or an electrostrictive element.

In FIGS. 1A and 1B, the electro-mechanical element 21 and 21A are shown as piezoelectric elements, but they may be magneto-resistive elements or any other elements capable of providing sufficient movement when receiving the generated servo feedback signal.

Elements 21 and 21A each have the dual function of providing both the mechanical dither oscillatory movement to end of fiber 12, and the servo actuation for aligning the fiber ends. In each FIGS. 1A or 1B element 21 or 21A is fastened to the "receiving end" of the pair of mating ends, which in FIG. 1A is the end of fiber 12 which receives the light from the mating end of fiber 11. But in FIG. 1B (in which light is transmitted in the opposite direction from fiber 12 to fiber 11), the receiving end is the mating end of fiber 11; and piezoelectric element 21A is fastened instead to the mating end of fiber 11—with the end of fiber 12 being fastened directly to the connector receptacle frame. The opposite end of each piezoelectric element 21 and 21A is connected to the connector frame to dither, and to move, the receiving fiber end relative to the frame.

Thus in FIG. 1A, one side of element 21 is fastened to the receptacle frame and an opposite side of element 21 is fastened to fiber 12. These two sides are respectively connected to electrical leads 22 which have their other ends connected to a driving dither oscillator signal source 23. The driving signal from source 23 has a frequency in the range of hundreds or thousands of hertz, which induces low-frequency dither light modulation that will not interfere with carried conventionally-modulated light signals (in the range of hundreds of millions of hertz) being transmitted by fibers 11 and 12, and will not create any perceptible vibration in the connector.

The "driving dither signal" provided by source 23 is an alternating current (AC) applied to piezoelectric element 21, which mechanically expands and contracts piezoelectric element 21 to oscillate the receiving end of fiber 12 in a direction transverse to the axis of fiber 12. This causes a transverse mechanical oscillatory motion to the receiving end of fiber 12 relative to the stationary mating end of fiber 11. This relative dither movement varies the amount of overlap between the mating ends of the fibers to vary the amount of light transmitted between the ends. This overlap variation oscillates the light intensity in the end of fiber 12 at the dither frequency.

The mechanical oscillation of the fiber ends is in a direction transverse to the axis of the fiber—with one fiber end moving parallel to its mating end under the driving motion of piezoelectric element 21. As the mating fiber ends oscillate relative to each other, the maximum intensity of the detectable dither alternating signal is obtained at the instant that the fiber ends completely overlap during the mechanical dither's alternating cycle. As the fiber ends move in either direction away from their completely overlapped position, the intensity of the detectable dither signal decreases.

Continuous dither AC cycling occurs for the transducer detected electrical signal sent to detector 27 (or 27A). Detector 27 filters the AC dither signal from other signals obtained from the light, and processes it into a dynamic DC resulting signal by relating the transduced light signal 26 to a dither reference signal 33 in a manner described herein for FIGS. 2A, 2B and 3. The resulting signal is provided to a DC servo signal generator 28 (or 28A) which amplifies it and optionally combines it with an initially adjusted DC signal from line 37 (or 37A) from a rheostat 30 (or 30A). This DC level is added to the resulting output signal from dither signal detector 27 (or 27A) to generate the DC servo output signal provided on lines 29 (or 29A) to the piezoelectric element 21 (or 21A).

Rheostat 30 (or 30A) is manually set by rotating a screw 35 (or 35A) that adjusts the resistance in the rheostat to control its output DC level provided to the DC servo signal amplifier 28 (or 28A) on line 37 (or 37A) to initially move the mating fiber ends into their steady-state aligned position. The pair of leads 29 from amplifier 28 or 28A provided a DC servo feedback signal which are connected to opposite sides of element 21 or 21A, which may use the same connection points that are connected to the AC driving dither signal oscillator 23. Use of the same connection points for both sources of signals simplifies the manufacture of element 21 and 21A. The servo feedback signal is primarily a DC signal, while the driving dither signal is an AC signal which acts as a dither signal on the DC signal.

If a transmit and receive transducer (simultaneously providing operations of both transducers 14 and 31 in FIGS. 1A and 1B) provides simultaneous bi-directional transmission of light (in both directions) in fibers 11 and 12, then either system shown in FIGS. 1A or 1B may be used; the system in FIG. 1A is preferred.

FIG. 3 shows a block diagram of the servo control process used in the preferred embodiment. Its method processes the electrically transduced dither signal received from the light-to-electric transducer 14 or 32. Step 62 in FIG. 3 represents the transducing of the light to an electrical signal and provides waveform signals of the type shown in the left column of FIGS. 2A and 2B (which shows only a single cycle of the detected dither signal for different examples of steady-state alignment/mis-alignment of the mating ends).

In a next step 63, an A/D converter digitizes the detected waveform by applying positive and negative voltage clip levels (threshold levels) to the received dither signal waveform which alternates around a zero voltage level. A pulse is generated on each crossing of either clip level.

In step 64, the pulses are sent to a pulse counter, which counts the pulses generated during each dither oscillator cycle, and uses the pulse count during the next dither oscillator cycle to lookup a resulting output voltage and its polarity, which provides a servo feedback signal that is sent to a servo amplifier 28 as a servo component to control the servo operation.

Then, step 65 combines the resulting output voltage with a DC bias signal which is initially determined to adjust mating fiber ends to their complete alignment position. The combined signals are amplified and sent to the piezo-electric servo to control the servo movements for maintaining the mating fiber ends in a continuous alignment state.

Detected Dither Waveform Description:

The left column in FIG. 2A shows one cycle of several waveforms illustrating signal amplitude vs. time. FIG. 2A(A) shows a cycle of the dither reference signal waveform generated by the dither driving signal oscillator 23. This signal, when applied to the piezo-electric element 21 or 21A cause it to drive its connected fiber end with a dithered oscillatory motion is in a direction transverse to the axis of the fiber about a steady-state alignment position between the mating fiber ends.

The left column also contains waveforms B through F—which are in separate rows herein called FIGS. 2A-B through 2A-F. They each contain an example showing a single cycle of a detected dither signal waveform occurring for a different alignment condition of the mating ends. Each waveform is caused by the mechanical dither oscillation between mating fiber ends in a connector about a steady-state alignment/mis-alignment state illustrated in the center column.

The zero value in each of the dither signal waveforms in FIGS. 2A-B through 2A-F occurs when the mating ends pass through an associated steady-state position during the dither cycle. The associated steady-state position is shown in the middle column in each of FIGS. 2A-B through 2A-F. The associated steady-state alignment or mis-alignment state for the mating ends is shown by the relative positions of shaded and unshaded circles. The dithered oscillatory motion (driven by piezoelectric element 21 or 21A) is centered about this steady-state position, and the dither provides only a relatively small amount of mechanical motion—for example 10 millimeters of relative movement between the mating ends which have a 50 millimeter diameter.

The right column in FIG. 2A shows examples of range of intensity variations occurring for different steady-state positions of alignment of the mating ends in the associated center column. The basic waveform in FIG. 2A is the variation in intensity as the overlap of mating ends changes. The mechanical oscillatory overlap between the mating ends of fibers 11 and 12 involves movement of the fiber ends between left and right extreme oscillatory positions which are equidistant from the illustrated steady-state position of the fibers 11 and 12.

The right column in FIGS. 2A-B through 2A-F represent different ranges of light intensity as the mating ends are mechanically dithered about the various steady-state alignment conditions in the middle column. The maximum intensity in any of these waveforms is obtained at the instant the mating ends pass through the aligned state when the fiber ends completely overlap during their mechanical oscillatory motion transverse to the fiber axis, which is when they pass the maximum amount of light. The minimum intensity is obtained when the fiber ends reach a no overlap state during their oscillatory motion, which is when they cannot pass any light. In all of these waveforms, it is presumed that each dither oscillator cycle starts by moving the receiving mating fiber end to the left relative to the other mating fiber end.

The intensity of the detected electrical waveform of the dither signal on line 26 or 26A in FIGS. 1A or 1B is therefore represented by these illustrated waveforms and they are directly dependent on the overlap variations during the dither oscillations.

The waveform in FIGS. 2A-D represents the steady-state aligned case in which the dithered fiber end (shaded circle) coincides with the non-dithered fiber end (unshaded circle). There, the oscillating fiber end starts from a complete overlapped (maximum intensity) position and oscillates to the left to minimum intensity during the dither oscillator's first quarter cycle (see FIG. 2A-A), during which the detected signal waveform goes through $\frac{1}{2}$ cycle. During the second oscillator quarter cycle, the detected signal waveform goes through its next $\frac{1}{2}$ cycle, in which the signal reverses and goes to the right from its minimum overlap back to its maximum overlap (i.e. back to the completely overlapped position). During the third and fourth oscillator quarter cycles, the dither signal goes though two more $\frac{1}{2}$ cycles—as the shaded circle passes through the maximum overlap and continues to the right and then reverses and goes to the left back to the steady-state position of maximum overlap. The frequency doubling is illustrated during this single dither reference cycle, during which the detected signal has gone through two symmetrical cycles to provide the double frequency.

Hence, the frequency doubling effect occurs in both half cycles of the dither reference oscillator signal when the fiber ends are steady-state aligned. This condition does not generate any servo feedback positioning signal, so that the piezoelectric element 21 will maintain this steady-state aligned state for the mating fiber ends. Any steady-state aligning DC adjustment signal is however maintained.

Figure 2B:
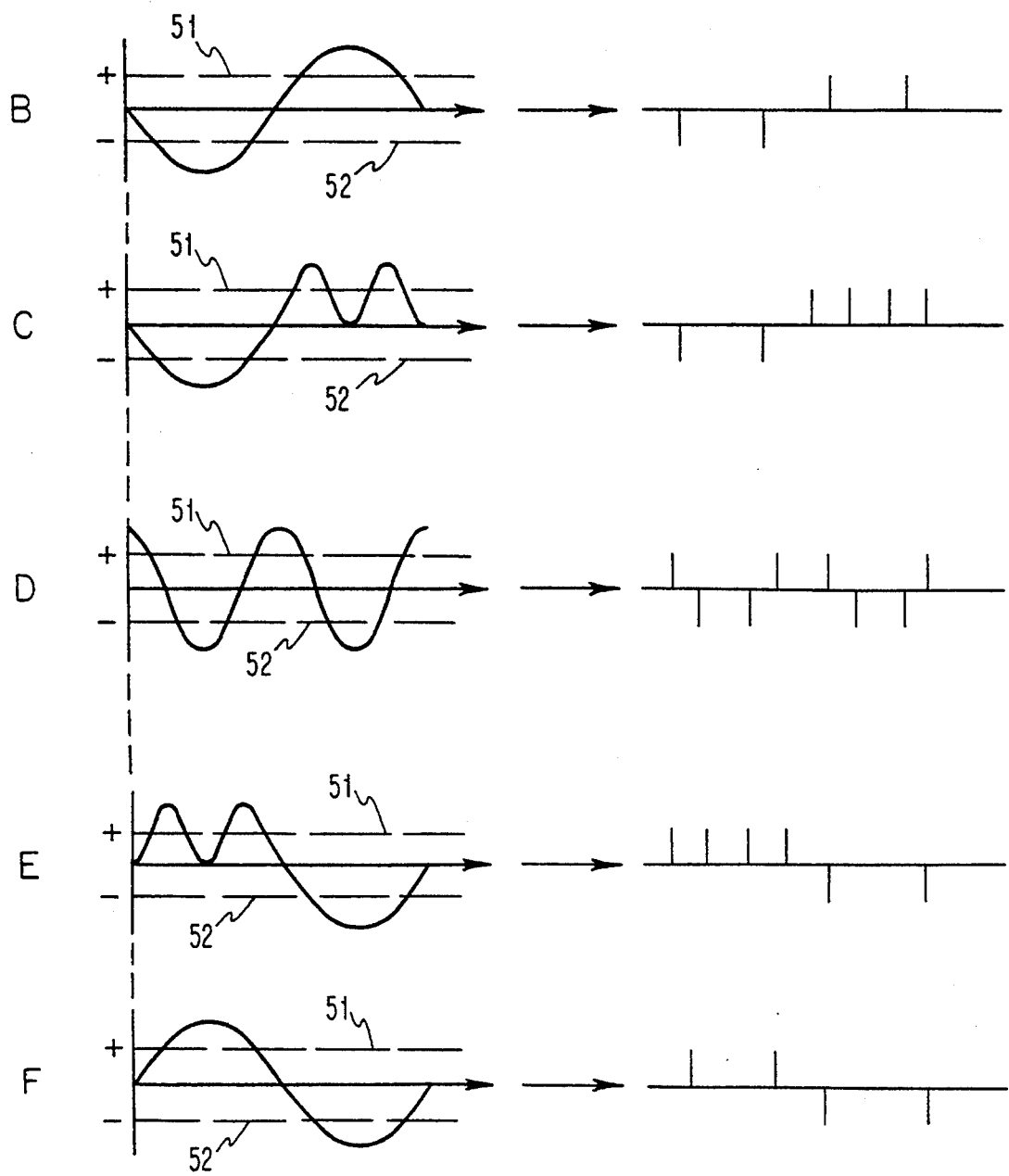
FIGS. 2B(B) through 2B(F) show the same waveforms as in FIGS. 2A(B) through 2A(F) receiving a dithered-modulated waveform to which is applied positive and negative threshold signals for generating digital pulses when the analog signal crosses the threshold level in either a positive or negative direction for use in an analogue to digital (A/D) converter.

Steady-state mis-alignment conditions are illustrated in FIGS. 2A-B, 2A-C, 2A-E and 2A-F. FIGS. 2A-B shows a case of high misalignment, in which no complete overlap occurs between mating fiber ends during any part of the dither movement. As the oscillating fiber end swings to the left (during the first oscillator half cycle), the overlap continues to decrease to provide the detected first half cycle. And as the oscillating fiber end swings to the right (during the second oscillator half cycle), the overlap continues to increase to provide the detected second half cycle.

FIGS. 2A-F shows the reverse case of high misalignment, in which no complete overlap occurs between mating fiber ends during any part of the dither movement. As the oscillating fiber end swings to the left (during the first oscillator half cycle), the overlap continues to increase to provide the detected first half cycle. And as the oscillating fiber end swings to the right (during the second oscillator half cycle), the overlap continues to decrease to provide the detected second half cycle.

Slight misalignments are represented in FIGS. 2A-C and FIGS. 2A-E which shown a lesser amount of misalignment than shown in high misalignment cases in FIGS. 2A-B and 2A-F. The slight misalignment cases differ from the high misalignment cases in that: the slight misalignment cases pass through the completely overlapped position during their dither cycling, while the highly misaligned cases do not pass through the completely overlapped position during their cycling. The slightly mis-aligned cases have a steady-state misaligned state which is slightly off of the completely aligned position. Therefore the slightly mis-aligned cases each will dither through the completely aligned position only during one of the half cycles of any dither oscillator reference cycle. The direction of the steady-state mis-alignment relative to the aligned position is determined by whether the completely aligned position is passed through during the first or second half of the dither oscillator reference cycle. That is, whether the completely aligned position is passed through during the first or second half of the dither oscillator reference cycle depends on whether the steady-state mis-alignment is on the left or right of the completely aligned position at the start of each dither oscillator cycle.

In FIGS. 2A-C, the dither oscillator cycle starts by moving to the left and goes away from the completely aligned position, so that a half cycle occurs for the detected signal while the dither oscillation also goes through a half cycle. But during the next dither quarter cycle, the moving fiber end passes through the completely aligned position and generates a half cycle for the detected signal. Finally during the last dither quarter cycle, the moving fiber end reverses and again passes through the completely aligned position to generate another half cycle for the detected signal.

The polarity and magnitude of the servo DC feedback signal is controlled by whether a frequency doubling occurs and in which half cycle of the dither oscillator reference cycle it occurs.

The magnitude will be zero for the aligned case in FIGS. 2A-D (which has no frequency doubling), and will be non-zero for the other cases, which have frequency doubling in one or both half cycles. In this way, steady-state alignment is obtained and maintained by the DC servo output signal to the piezoelectric element.

Digitized Dither Signal Detection:

FIG. 3 is a detailed representation of circuit logic in detector 27 (and 27A) in FIGS. 1A and 1B. Line 26 (or 26A) from the transducer 14 (or 32) is connected to an analog-to-digital converter (A/D converter) component 41 included in the dither signal detector 27 (or 27A).

The operation of A/D converter 41 is represented in FIG. 2B by the waveforms in the left column and by the associated pulse sequences shown in the right column. A/D converter) 41 receives the detected waveforms (examples of which are shown in FIG. 2B) from the transducer 14 (or 32). The rows in FIG. 2B are herein called FIGS. 2B-B through 2B-F, and their waveforms are the same waveforms shown in FIGS. 2A-B through 2A-F.

In A/D converter 41, a positive voltage level 51 and a negative threshold voltage 52 level are applied to the detected dithered signal received from transducer 14 (or 32). These threshold levels are voltage clip levels in FIGS. 2B-B through 2B-F. A pulse is generated by conventional means whenever the detected dithered signal (an analog signal) crosses either threshold level 51 or 52 in either a positive or negative direction.

The pulses in the sequences in the right column are shown with two polarities (positive and negative), these polarities are used in some cases in the preferred embodiment.

The preferred embodiment detects the start of each half of a dither oscillator cycle. To do this, the dither signal oscillator 23 provides a pulse on the dither reference signal line 33 to detector 27 at the start of each half dither oscillator half cycle. These pulses distinguish the first half of the dither cycle from the last half of the dither cycle, and this may be done by using a positive polarity reset pulse for indicating the start of the first half cycle, and a negative polarity reset pulse for indicating the start of the second (last) half cycle.

The first half cycle reset pulses and the last half cycle reset pulses are respectively connected to a first half reset input and a last half reset input to a counter 42. Counter 42 in the preferred embodiment needs to only count up to four pulses using counts 0 to 3 indicated by permutations of at least two bits; however, three bit counter 42 is being used herein which can count 0 to 7. Counter 42 is therefore reset every half cycle of the dither oscillator reference waveform, and its count at the end of each half cycle is recorded in a respective 3 bit field in memory 43, which are a first half cycle field and a 3 bit second half cycle field.

Memory 43 also contains a polarity bit, which is set to a zero or one state. The polarity bit is set according to the polarity of the first pulse in the sequence of pulses generated during each first half cycle (i.e. the first sequence pulse following the first half cycle reset pulse). The polarity bit is set to a zero state for representing when the first sequence pulse has a positive polarity, and to a one state for representing when the first sequence pulse has a negative polarity. When the mating fiber ends are highly mis-aligned (indicated by a 4 bit full cycle pulse count), the polarity bit state is needed to indicate the phase of the detected dither waveform for determining the direction of movement needed to control the servo operation (see FIGS. 2B-B and 2B-F).

Counter 42, memory 43 and table 44 are functions provided by a processor 46 which effectively receives the pulse sequences and the half cycle reset pulses from the reference signal line 33 of the dither oscillator 23.

At the end of each full cycle, processor 46 reads the pulse count value posted in both half cycle fields in memory 43. The pulse count over each full dither oscillator cycle indicates the servo action required to move the mating fibers toward their steady-state aligned position. The first half cycle reset pulse marks the end of the last full cycle count for the last oscillator reference cycle, and is used by the processor to perform a read access in the table in FIG. 3C, which is in the processor memory (and is initialized prior to beginning the servo operation). Examples of full cycle counts are shown in the right column of FIG. 2B.

In response to each pulse count lookup operation in the one-half cycle lookup table, the processor looks up a pulse count and polarity to obtain a corresponding output voltage magnitude and servo direction indication. Each output voltage in the table has an output polarity required by the servo to move the mating fibers toward their steady-state aligned position.

The processor outputs the looked up voltage and polarity to the DC servo signal amplifier 28 which generates the required voltage and sends it to the piezoelectric element which acts as the servo motor element.

The polarity bit need not be used for all full cycle pulse counts, and its use is only required with the pulse count of 4 (indicating high mis-alignment). When the mating fiber ends are highly mis-aligned, the polarity information is necessary to indicate the phase of the detected dither signal relative to the oscillator reference signal for controlling the direction of servo movement. But with a full cycle pulse count of 6 (indicating slight mis-alignment), the polarity bit need not be used, because the direction of servo movement may instead be determined by examining the count in the first half cycle field (or in the last half cycle field) as is shown in FIGS. 2B-C and 2B-E. Then, if the first half cycle field is found to contain a count of 2, the servo is required to move in one direction; but if the first half cycle field is found to contain a count of 4, the servo is required to move in the other direction. (This count/servo-direction relationship is reversed if the last half cycle field count was examined instead of the first half cycle field.)

Also, if the table lookup operation uses the full cycle pulse count of 8 (indicating complete steady-state alignment), zero output voltage is found and signalled to amplifier 28, since no servo movement is to be activated in this case; and no examination need be done of either the first half cycle field (or the last half cycle field).

Accordingly, processor 46 determines and provides a resulting output voltage as the servo control signal, which maintains a fixed voltage level over most of the period of each dither oscillator cycle—which level and polarity is based on the pulse count and polarity bit state recorded in the memory as determined for the last dither oscillator cycle. The per cycle resulting output voltage is therefore obtained at the beginning of each next cycle by the last table lookup of the last pulse count.

Module Mounting for the Embodiment:

The system described can be mounted in a connector and its supporting module.

The dithering apparatus can be either a piezoelectric crystal assembly or a thin film electrostrictive actuator. An electrostrictive embodiment has some advantages since it can be implemented by a thin film bonded directly to a connector housing. In either case, the connector offers unique advantages over the existing state of the art.

The active alignment connector of this invention may be located in a well in the lower frame of the air-cooled TCM (thermal conducting module). Locating the active alignment interface in the lower frame provides a direct path that passes through the perimeter housing seal to internal substrate wiring and photonic devices, locates the active alignment interface external to the sealed module environment and provides a low profile side entry pluggable optical fiber connector.

Figure 4:
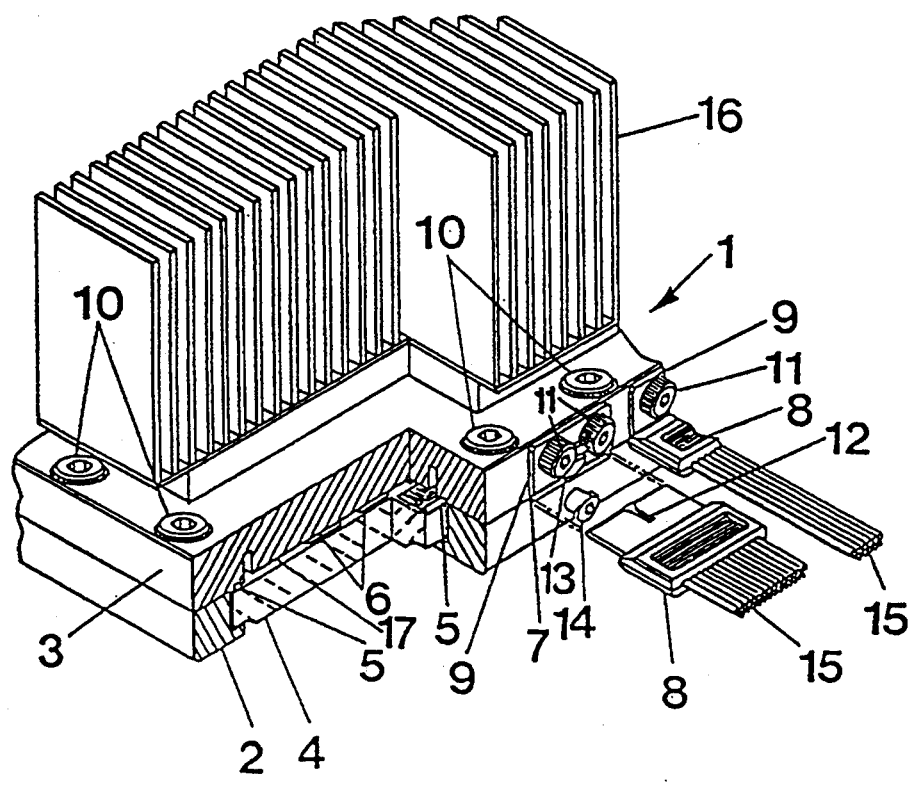
FIG. 4 shows a 3-dimensional exploded view of an optical fiber connector which may contain the invention in either its receptacle or plug.

FIG. 4 illustrates such a connector/module arrangement by showing a partially sectioned air-cooled TCM comprising a lower frame 2, an upper frame 3 with a direct coupled heat sink 6 that provides a multi-chip substrate protective enclosure when bolted together by bolts 10 with the through-seal interface 5 in place. Semiconductor chips 6 and in contact with the bottom surface of heat sink coupling plate 17. The well for receiving pluggable optical fiber connector assembly 8 is formed by well 7 in lower frame 2 and the reference surface of lateral adjustment bracket 9, attached to upper frame 3 by cap screw 11. Suitable alignment pins in the upper frame 3, not shown, will secure the position of the well when the upper and lower frames are bolted together with bolts 10, spaced about the perimeter of frame member 3.

The circuits required by the subject invention may be mounted either on the module with wiring to the connector, or in the connector to which is supplied power for operating the servo and its controls.

The reference surface of lateral adjustment bracket 9 has a protrusion for engaging guide slot 12 of pluggable optical fiber connector assembly lateral adjustment of right angle bracket 9 is effected by loosening caps 11, rotating eccentric cam 13 and retightening cap screws 11. To engage pluggable optical fiber connector assembly 8 to the frame mounted silicon optical fiber receptacle, not shown, pluggable optical fiber connector assembly 8 is inserted in slot 7 until it engages the silicon optical fiber receptacle. The radial segment cam 14 is rotated an appropriate clockwise distance with a suitable tool to fully engage the pluggable optical fiber connector 8 to silicon fiber receptacle which completes the optical path between the optical fiber cables 15 and the internal optical receivers or transmitters on the surface of substrate 4.

Figure 5:
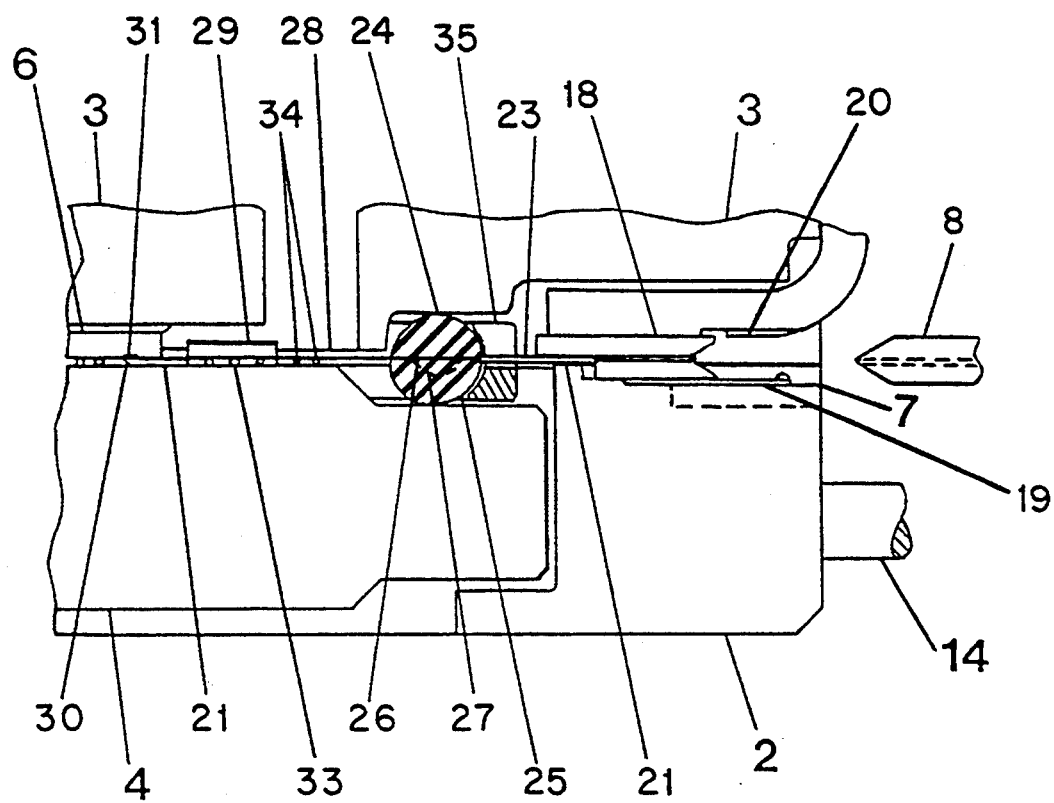
FIG. 5 is a cross-sectional view of the module, frame, connector receptacle and disengaged connector plug shown in FIG. 4.

FIG. 5 is an enlarged cross-sectional view of the silicon optical fiber receptacle 18 mounted at the separable interface of frames 2 and 3. During insertion of pluggable optical fiber connector assembly slot 7, cantilever spring 19 is compressed to force the forward part of pluggable optical fiber connector assembly 8 against the reference surface of bracket 9 to maintain engagement of protrusion 20 in guide slot 12. This aligns bi-level optical fibers of pluggable member 8 and corresponding optical fibers in optical fiber receptacle 18. Referring to FIG. 4, clockwise rotation of radial cam 14 fully engages pluggable optical fiber assembly 8.

Optical fibers 21 and copper wires 22, part of encapsulated optical fiber/copper wire group 23, are soldered to internal members of optical fiber receptacle 18. The through-seal interface is a bonded assembly comprising an extension of encapsulated optical fiber/copper wire group 23 and seal halves 24 and 25. Continuous perimeter seal member 24 has a hemispherical protrusion 26 periodically disposed along its length. Seal element 25 has a corresponding periodic complementing cavity 27 disposed on similar spacing along its length. The hemispherical protrusions engage matching cavities through openings in encapsulated optical fiber/copper wire group 23 during adhesive bonding of the upper and lower sealmembers and the encapsulated optical fiber/copper wire group.

Individual clad optical fibers and copper wires are exposed from the end 28 of encapsulated optical fiber/copper wire group 23. The exposed clad optical fibers and copper wires are bonded to V-grooves in silicon distribution member 29. Clad optical fibers 21 extend beyond the edge of silicon distribution member 29 a predetermined distance so as to have its faceted ends 30 aligned properly with photonic devices 31 on semiconductor chip 6. Solder balls 32 have sufficient solder volume to maintain a minimum separation between surfaces of semiconductor chip 6 and substrate 4 of 0.006 inches. This space is sufficient to accommodate 0.005 inch diameter clad optical fibers. Similar solder balls 33 located on the ends of silicon distribution member 29 are used to maintain alignment of clad fibers 21 to respective photonic devices 31.

Linear staggered rows of solder balls 34 are disposed along the edge of silicon distribution member 29 so as to alternately bond to copper wires 22 or metallized optical fibers 21. These solder connections may provide electrical voltage levels to transverse and longitudinal piezoelectric or electrostrictive elements in the silicon optical fiber receptacle 18.

Seal constraint member 35 is seated about the elastomeric seal to maintain the seal position during assembly or disassembly of upper frame 5 to lower frame 2.

It should be understood that the above-described embodiments of this application are presented as examples and not as limitations. Modification may occur to those skilled in the art. Accordingly, the invention is not to be regarded as being limited by the embodiments disclosed herein, but as defined by the appended claims.

Having thus described our invention, what we claim as new and desire to secure by Letters Patent is:

1. A method for dynamically controlling alignment between mating ends of connected optical fibers, a light signal passing between the mating ends in at least one optical direction of transmission, the mating ends including a sending end and a receiving end for receiving light signals from the sending end in the optical direction, comprising the steps of:

mechanically connecting the receiving end to a dither actuating element, electrically connecting the dither actuating element to a dither oscillating source for mechanically oscillating the receiving end relative to the sending end at a dither reference frequency to dither-modulate light passing to the receiving end from the sending end, transducing the dither-modulated light into an electrical waveform, detecting the dither-modulated light during each half cycle of the dither reference frequency to determine if a double frequency or single frequency signal exists during each half cycle, generating a servo signal indicating alignment between the mating ends when a double frequency is detected during both half cycles of each cycle of the dither reference frequency, but instead generating a servo signal indicating slight mis-alignment between the mating ends when a double frequency is detected during only one of a first half cycle and a second half cycle in each cycle of the dither reference frequency, and further detecting whether the double frequency occurred during the first half cycle or the second half cycle, and the generating step determining one polarity for the servo signal when the double frequency occurred in the first half cycle, and determining another polarity for the servo signal when the double frequency occurred in the second half cycle.

2. A method for dynamically controlling alignment between mating ends of connected optical fibers as defined in claim 1, further comprising:
   the detecting step indicating when a single frequency signal is found for the waveform during each half cycle of the dither reference frequency,
   the further detecting step determining one polarity for the servo signal when one phase is detected for the single frequency signal and determining another polarity for the servo signal when another phase is detected for the single frequency signal, and
   the generating step generating a servo signal for controlling a large mis-alignment between the mating ends when the single frequency signal is detected during both half cycles in each cycle of the dither reference frequency.

3. A method for dynamically controlling alignment between mating ends of connected optical fibers as defined in claim 2, further comprising the step of:
   converting in an analog-to-digital converter a fixed number of pulses for each half cycle of the electrical waveform occurring during each reference half cycle of the dither reference frequency, counting by a processor element the number of pulses converted during each reference half cycle and each pulse count being either a high count or a low count, storing each pulse count, determining a cycle pulse count comprised of the sum of the pulse counts for the two halves in each reference cycle of the dither reference frequency, and looking up each cycle pulse count in a table accessible by the processor element to find a corresponding servo value,
   and generating a voltage proportional to the corresponding servo value as a servo signal component for driving the dither actuating element.

4. A method for dynamically controlling alignment between mating ends of connected optical fibers as defined in claim 3, further comprising the step of:
   determining whether high counts are stored for both cycles of a reference cycle for indicating alignment of the mating ends.

5. A method for dynamically controlling alignment between mating ends of connected optical fibers as defined in claim 3, further comprising the step of:
   determining whether the low count and the high count are stored for the half cycles of a reference cycle for indicating slight mis-alignment of the mating ends.

6. A method for dynamically controlling alignment between mating ends of connected optical fibers as defined in claim 3, further comprising the step of:
   determining whether low counts are stored for both cycles of a reference cycle for indicating large alignment between the mating ends,
   storing a polarity signal for indicating a phase for a first electrical waveform half cycle occurring during a first half cycle of each cycle of the dither reference frequency, and
   examining the polarity signal stored for the reference cycle when only low counts are stored for the reference cycle to indicate the polarity of the servo signal to control the direction of movement of the dither actuating element to obtain alignment of the mating ends.

7. A method for dynamically controlling alignment between mating ends of connected optical fibers as defined in claim 2, further comprising the step of:
   super-imposing a manually-adjustable direct current (DC) signal on the servo signal to initially bias the dither actuating element to initially align the mating ends and the servo signal adjusts for deviations therefrom.

8. A method for dynamically controlling alignment between mating ends of connected optical fibers as defined in claim 2, further comprising the step of:
   making the dither actuating element from material that contracts and expands when receiving a voltage gradient in the direction of contraction and expansion.

9. A method for dynamically controlling alignment between mating ends of connected optical fibers as defined in claim 8, further comprising the step of:
   making the dither actuating element from piezoelectric crystal.

10. A method for dynamically controlling alignment between mating ends of connected optical fibers as defined in claim 8, further comprising the step of:
    making the dither actuating element from electro-strictive material.

11. A method for dynamically controlling alignment between mating ends of connected optical fibers as defined in claim 8, further comprising the step of:
    depositing the electro-strictive material on an outer surface of the fiber having the receiving end, and
    applying the servo signal to the electro-restrictive material for moving the mating ends toward alignment when the detecting step detects an out-of-alignment condition.

12. A method for dynamically controlling alignment between mating ends of connected optical fibers as defined in claim 8, further comprising the step of:
    connecting to the dither actuating element a pair of terminals spaced apart in an alignment-adjusting direction for applying the servo signal with a polarity for moving the mating ends toward maintaining an alignment position.

13. A method for dynamically controlling alignment between mating ends of connected optical fibers as defined in claim 2, further comprising the step of:
    mechanically restraining movement between the mating ends in all directions except in a non-restrained direction in which movement is controlled by the dither actuating element.

14. A method for dynamically controlling alignment between mating ends of connected optical fibers as defined in claim 13, further comprising the step of:
    supporting the mating fiber ends in a connector having a V-groove formed between a receptacle and a plug respectively supporting the mating ends to enable movement of the receiving end in the non-restrained direction.

15. A method for dynamically controlling alignment between mating ends of connected optical fibers as defined in claim 13, further comprising the step of:
    supporting in the receptacle an array of receiving ends physically connected to the receiving end, and supporting in the plug an array of sending ends physically connected to the sending end,
    engaging the mating ends at an apex of the V-groove, and
    aligning all fibers in the array of sending ends and all fibers in the array of receiving ends when the actuating element moves in the non-restrained direction under control of the servo signal.

16. A method for dynamically controlling alignment between mating ends of connected optical fibers as defined in claim 2, further comprising the step of:

arranging two servo systems in a connector for aligning an array of receiving ends with an array of sending ends in the connector, allowing relative movement between receiving ends and sending ends of the arrays in two directions in the connector transverse to the axis of the arrays, physically connecting a dither actuating element in each of the two servo systems to the receiving ends, and connecting a dither oscillating signal to the dither actuating elements for dither vibrating the two elements in transverse directions to enable control alignment for the array of receiving ends in two directions transverse to an axis of the array to generate respective dither modulated light signals in the receiving ends, transducing dither modulated light signals to generate two waveforms for the transverse directions of dither modulated light signals, detecting each of the waveforms relative to the dither oscillating signal to determine current alignment of the receiving ends relative to the sending ends to generate two separate servo signals for the transverse directions of alignment, and applying the two servo signals to respective dither actuating elements to drive the receiving ends towards and to maintain alignment of the receiving ends with the sending ends.

17. A method for dynamically controlling alignment between mating ends of connected optical fibers as defined in claim 16, further comprising the step of:

super-imposing independent manually-adjustable direct current (DCs) signals on each of the servo signals to initially bias dither actuating elements to initially align the mating ends and the servo signal adjusts for deviations therefrom.

18. A mechanism in an optical fiber pluggable connector for dynamically controlling alignment of mating fiber ends in a predetermined direction, the mating fiber ends including a receiving end and a sending end, comprising:

a dither actuating element mechanically connected to the receiving end, a dither oscillating source electrically connected to the dither actuating element for mechanically oscillating the receiving end relative to the sending end at a dither reference frequency to dither modulate light passing to the receiving end from the sending end, a light-to-electric transducer for converting the dither modulated light into an electrical waveform, a waveform detector connected to the transducer and to the dither oscillating source for processing the dither-modulated light, including detection circuits for detecting the electrical waveform during each half cycle of a dither reference frequency from the dither oscillating source to determine if a double frequency or single frequency signal exists during each half cycle, the detection circuits indicating alignment between the mating ends when the double frequency is detected during both half cycles of each cycle of the dither reference frequency, and servo signal generating circuits connected to the detection circuits for generating a servo signal indicating slight mis-alignment between the mating ends when a double frequency is detected during only one of a first half cycle and a second half cycle in each cycle of the dither reference frequency, and further determining which half cycle the double frequency occurred for determining one polarity for the servo signal when the double frequency occurred in the first half cycle, and for determining another polarity for the servo signal when the double frequency occurred in the second half cycle.

19. A mechanism for dynamically controlling alignment between mating ends of connected optical fibers as defined in claim 18, further comprising the step of:

an analog-to-digital converter for generating a fixed number of pulses for each half cycle of the electrical waveform occurring during each reference half cycle of the dither reference frequency, a processor element for counting the number of pulses occurring during each reference half cycle and each pulse count being either a high count or a low count, for storing each pulse count, for determining a cycle pulse count comprised of the sum of the pulse counts for the two halves in each reference cycle of the dither reference frequency, and for looking up each cycle pulse count in a table accessible by the processor element to find a corresponding servo value, and circuits for generating the servo signal as a voltage proportional to the corresponding servo value.

20. A mechanism for dynamically controlling alignment between mating ends of connected optical fibers as defined in claim 19, further comprising the step of:

the processor element determining whether high counts are stored for both cycles of a reference cycle for indicating alignment of the mating ends.

21. A mechanism for dynamically controlling alignment between mating ends of connected optical fibers as defined in claim 19, further comprising the step of:

the processor element determining whether the low count and the high count are stored for the half cycles of a reference cycle for indicating slight mis-alignment of the mating ends.

22. A mechanism for dynamically controlling alignment between mating ends of connected optical fibers as defined in claim 21, further comprising the step of:

the processor element determining whether low counts are stored for both cycles of a reference cycle for indicating large alignment between the mating ends, the processor element storing a polarity signal for indicating a phase for a first electrical waveform half cycle occurring during a first half cycle of each cycle of the dither reference frequency, and the processor element examining the polarity signal stored for the reference cycle when only low counts are stored for the reference cycle to indicate the polarity of the servo signal to control the direction of movement of the dither actuating element to obtain alignment of the mating ends.

* * * * *